June 4, 1968  J. M. COPELAND ET AL  3,386,433
DEVICE FOR COOKING FOOD

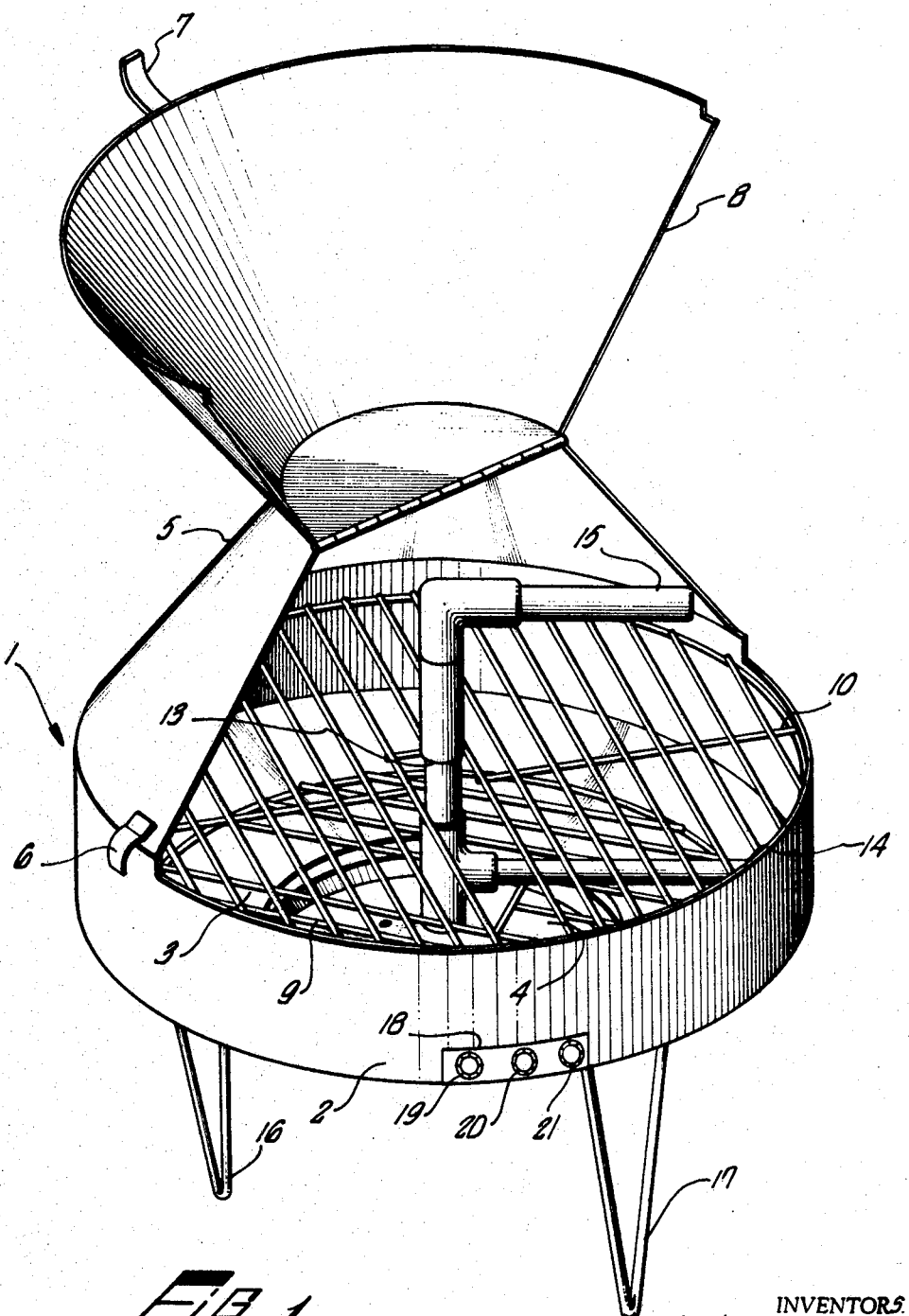

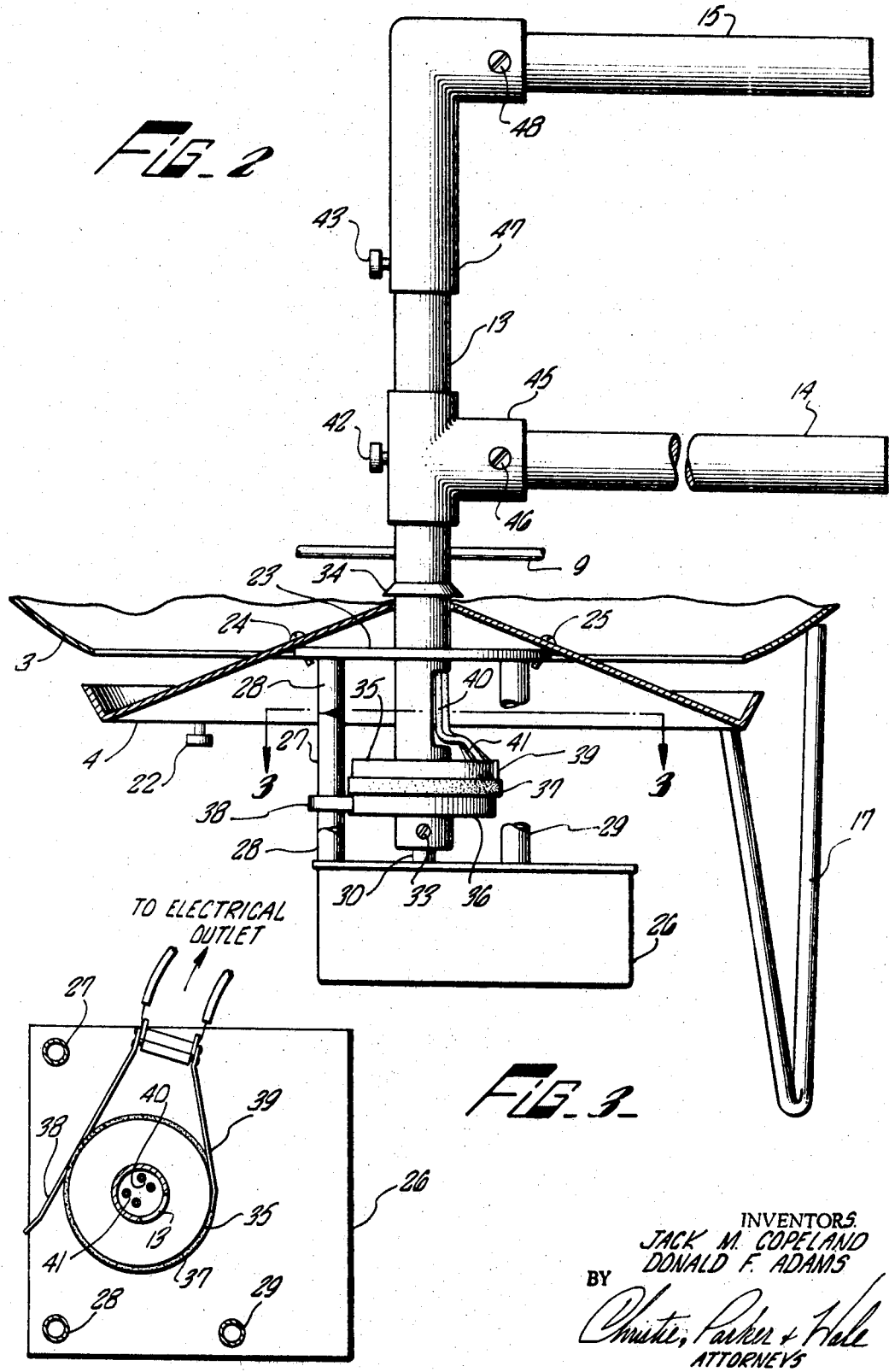

Filed July 18, 1966  3 Sheets-Sheet 3

INVENTOR.
JACK M. COPELAND
DONALD F. ADAMS
BY
Christie, Parker & Hale
ATTORNEYS.

3,386,433
DEVICE FOR COOKING FOOD
Jack M. Copeland, 803 Calabria, and Donald F. Adams, 228 Catherine Park Drive, both of Glendora, Calif. 91740
Filed July 18, 1966, Ser. No. 566,158
19 Claims. (Cl. 126—41)

This invention relates to a cooking appliance and, more particularly, to a device for roasting and broiling food.

A rotisserie is commonly used to cook items of food, at the same time browning its surface. In a rotisserie, an item of food is roasted or broiled while it is supported on a spit that rotates past a stationary source of heat. Thus, the food is evenly roasted and browned as it is rotated. A disadvantage of this arrangement is that in placing the food on the spit its surface is punctured by the spit and by prongs holding the food. Juices of the food escape through the juncture holes during roasting, thereby causing excess smoke and flame-ups, making cleaning more difficult, and drying out the food.

In addition, difficulties are encountered if the item of food is not well-balanced on the spit. Imbalance of the food causes it to slip on the spit during rotation and thus tears the food loose from the spit. Even if the food stays in place on the spit, imbalance usually causes a variable speed of rotation because the load on the motor varies as the spit rotates. This gives rise to uneven cooking and browning.

Patent 3,177,342, issued Apr. 6, 1965, to C. H. Wickenberg teaches that an item of food may be cooked by placing it on a stationary support and moving a source of heat. A heating element that surrounds the food rocks back and forth without passing beneath the food, to prevent the drippings from coming in contact with the heating element. The item of food is not, however, evenly browned, since the heating element in rocking back and forth forms an envelope surrounding only a portion of the food. Furthermore, it is difficult to move a heating element at a constant speed when it must stop and start at the ends of its excursion. This brings about further unevenness in browning.

In contrast, food is cooked on a stationary support according to the invention while a heating element is completely and continuously rotated in one direction. As a result, heat is distributed uniformly about the food support and food held by the support is evenly roasted and browned. Moreover, no problems are encountered in moving the heating element at a constant speed, since it rotates completely and continuously without interruptions and always presents a balanced load to the motor.

More specifically, the stationary support has a horizontal surface on which the food rests and the heating element projects from and rotates about a vertical mast. According to a particular feature of the invention, two or more heating elements are provided, one or more projecting from the vertical mast above the food support and one or more projecting from the vertical mast below the food support. A second support for auxiliary fuel such as charcoal briquettes is provided in close proximity to the heating element below the food support. The second heating element kindles the auxiliary fuel, thereby permitting the characteristics of cooking with the auxiliary fuel to be imparted to the food In a modified embodiment of the invention a single heating element with one or more bowed portions are employed. When the bowed portion rotates, it forms an envelope surrounding the item of food being cooked.

These and other features of the invention are considered further in the following detailed description taken in conjunction with the drawings, in which:

FIG. 1 is a perspective view of a roasting device constructed in accordance with the principles of the invention;

FIG. 2 is a side view in section of a portion of the device shown in FIG. 1;

FIG. 3 is a top view in section of FIG. 2, illustrating the slip rings through which power is coupled to the heating elements;

Figure 4:
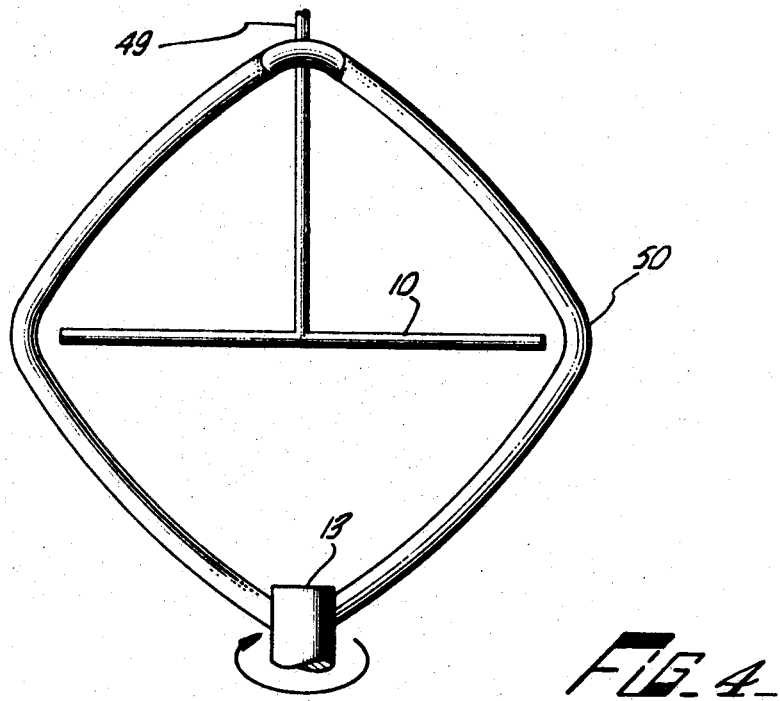
FIG. 4 is a side elevation view of a modified embodiment of the invention.

Reference is now made to FIG. 1, in which an enclosure 1 is shown comprising a disk-shaped lower portion 2 having a convexed bottom 3, a conical collector 4 for drippings and juice, and a lid 5. Lid 5 is attached to portion 2 by fasteners such as 6 and 7. Part of lid 5 is a hinged door 8 providing access to the interior of enclosure 1. Within enclosure 1, a lower grating 9, which supports auxiliary fuel such as charcoal, and an upper grating 10, which supports the food to be roasted, are adjustably held by conventional brackets not shown. A vertical mast 13 extends through collector 4 into the interior of enclosure 1. Heating elements 14 and 15 project from mast 13 above and below food support 10, respectively. As explained further in connection with FIG. 2, heating elements 14 and 15 rotate about mast 13 and the axial position of element 15 on mast 13 is adjustable. Electrical heating elements, such as conventional cartridge type (Incoloy construction) heaters, are shown in FIGS. 1 and 2. Other types of heat source could be employed, however, such as gas jets distributed along the surface of the heating elements. The length of heating elements 14 and 15 is slightly less than the radius of enclosure 1 to permit clearance during rotation, while obtaining uniform heat coverage of the area within the enclosure. Enclosure 1 stands on three legs such as 16 and 17. A control panel 18 having knobs 19, 20, and 21 to control the power on-off, the speed of rotation of mast 13, and the heat produced by elements 14 and 15, respectively, is conveniently located on the side wall of portion 2.

Reference is now made to FIG. 2, in which collector 4 is shown as a cone-shaped member with a lip around its edge and held in spaced relationship from bottom 3 by means of the legs such as 16 and 17, on which enclosure 1 stands. Juice and drippings from the food being roasted are removed to a container (not shown) through an outlet 22 located at the base of the cone. To make collection of juice and drippings more efficient, outlet 22 could be located at a low point on the base of the cone. A bracket 23 is attached to collector 4 by fasteners such as 24 and 25. A variable speed electric motor 26 is attached to bracket 23 by spacers 27, 28, and 29. The connections of electric motor 26 to an electrical outlet are not shown. Motor 26 is a variable speed motor of well-known type, which is controlled by knob 20 from control panel 18. In typical operation the speed of rotation can be four or five revolutions per minute. By employing a worm gear, the motor could be located to the side of enclosure 1 with its drive shaft situated in a horizontal position. In this case, the motor could easily be removed for cleaning and/or storage.

A drive shaft 30 of motor 26 is connected to mast 13 by a set screw 33. Mast 13 is supported by and rotates within a bushing (not shown) in bracket 23, through which it passes. A skirt 34 fastened to mast 13 prevents juices and drippings from dropping through the space between mast 13 and collector 4. Also fastened to mast 13 are slip rings 35 and 36 attached to an insulator 37. As shown more clearly in FIG. 3, stationary contacts 39 and 38, which are connected to opposite terminals of a standard electrical outlet, rest against slip rings 35 and 36 respectively, thereby establishing the electrical connection at the point of rotation. Pairs of insulated conductors 40 and 41 are connected to slip rings 35 and 36, respectively, and carry power to heating elements 14 and 15. The inside of mast 13, which is hollow, is preferably filled with insulating material.

Heating element 14 is attached by a bolt 46 to a bracket 45 that is fixed to mast 13 and heating element 15 is attached by a set screw 48 to a section 47 that is slidable along the axis of mast 13. After heating element 15 is adjusted to the desired height, its axial position is fixed by tightening set screw 43. In connection with the heating elements, many different arrangements coming within the scope of the invention are possible. For example, a hinged connection could be provided between the heating element and the slidable section to which it is attached, thereby permitting adjustment of the angle that the heating element forms with mast 13. Furthermore, the heating elements could be arranged upon opposite sides of mast 13 by loosening set screw 42 and rotating heating element 14 through 180°. Similarly, auxiliary heating elements could be located diamertically opposite heating elements 14 and 15 to form an I-shaped configuration.

Figure 5:
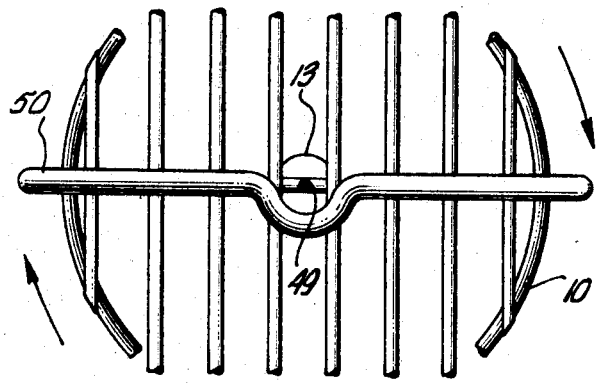
FIG. 5 is a top view of the embodiment in FIG. 4.

One such arrangement is shown in FIGS. 4 and 5. Grating 10 is supported from above by a member 49 fastened to enclosure 1. A bowed heating element 50 is attached to mast 13, whose length is shortened in this embodiment. As motor 26 drives mast 13, element 50 rotates and forms a complete envelope around the food being cooked. At its top, element 50 is bent around member 49 to prevent interference therewith.

What is claimed is:

1. In a device for cooking food, the combination comprising: means for fixedly holding food to be cooked; means located in proximity to the holding means for producing heat to cook food; and means for completely and continuously rotating the heat producing means in a single direction such that heat is transmitted uniformly about the holding means.

2. The cooking device of claim 1, in which the food holding means has a substantially plane surface, on which food to be cooked rests, and the heat-producing means rotates in a plane substantially parallel to the surface of the food holding means.

3. The cooking device of claim 1, in which means for holding auxiliary fuel are located sufficiently near the rotating means to enable the heat-producing means to kindle auxiliary fuel held by the holding means.

4. A device for cooking food comprising: an enclosure within which food is cooked; a stationary support for food to be cooked located within the enclosure; a heating element disposed within the enclosure adjacent the support; and means for continuously rotating the heating element in one direction such that heat is distributed uniformly around the interior of the enclosure.

5. The cooking device of claim 4, in which the support has a substantially plane surface, on which food to be cooked rests, and the heating element rotates in a plane substantially parallel to the surface of the support.

6. The cooking device of claim 4, in which the support lies in a substantially horizontal plane and a substantially vertical mast is provided, from which the heating element projects and about which the heating element rotates.

7. The cooking device of claim 6, in which the relative position between the heating element and the support is adjustable.

8. The cooking device of claim 4, in which the support has a substantially horizontal surface on which food to be cooked rests and a substantially vertical mast is provided from which a plurality of heating elements project, at least one heating element projecting from the mast below the support and at least another heating element projecting from the mast above the support.

9. The cooking device of claim 8, in which the relative position between said heating elements and the support is adjustable.

10. The cooking device of claim 8, in which a support for auxiliary fuel is located directly under the heating element projecting from the mast below the food support.

11. The cooking device of claim 8, in which the enclosure is disk-shaped, the mast is substantially centered within the enclosure, the heating elements are substantially perpendicular to the mast and have a length slightly smaller than the radius of the enclosure to permit clearance of the heating elements during rotation, while obtaining uniform heating coverage of the area within the enclosure.

12. The cooking device of claim 11, in which a holder for charcoal briquettes is located close enough under the heating element below the food support to enable this heating element to kindle charcoal briquettes in this holder.

13. The cooking device of claim 11, in which a conical member with a lip around its edge forms the bottom of the enclosure.

14. The cooking device of claim 13, in which an opening in the member at its base serves to remove juices collected in the member, and there is a low point on the conical member to facilitate drippings and juice removal.

15. The cooking device of claim 4, in which a support for auxiliary fuel is provided sufficiently near the heating element to kindle auxiliary fuel on the support.

16. The cooking device of claim 4, in which means are provided for collecting and removing the juices dropping from the fixed support.

17. The cooking device of claim 4, in which the support has a substantially horizontal plane surface and the heating element is bowed such that as it rotates an envelope is formed that surrounds the support.

18. The cooking device of claim 4, in which the heating element forms a loop that surrounds the support.

19. The cooking device of claim 18, in which the support is held to the enclosure by a vertical member above the support and the heating element rotates about the member, the heating element being bent at the top to avoid the member during rotation.

References Cited

UNITED STATES PATENTS 3,277,813  10/1966  Luscher _____ 99—391

FREDERICK KETTERER, *Primary Examiner.*